May 14, 1935.   A. SWAN ET AL   2,001,164
INDUCTION SYSTEM FOR INTERNAL COMBUSTION ENGINES
Filed Aug. 1, 1934
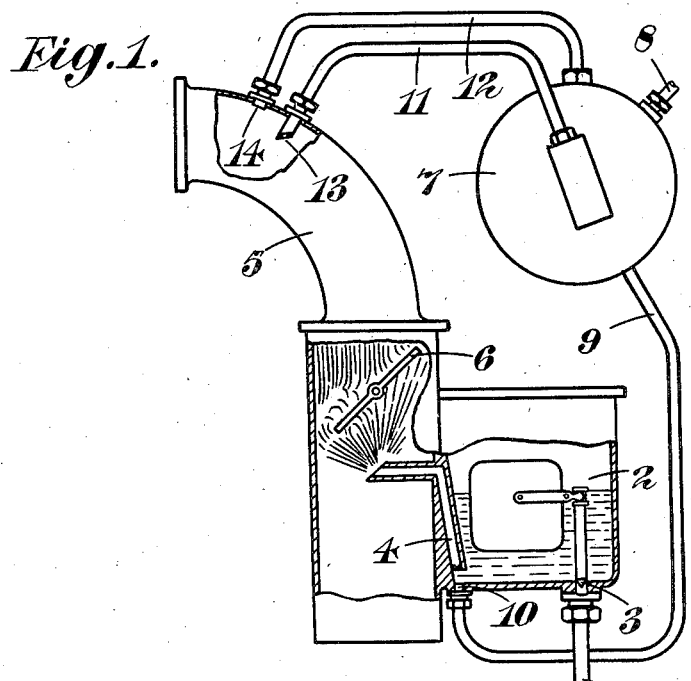
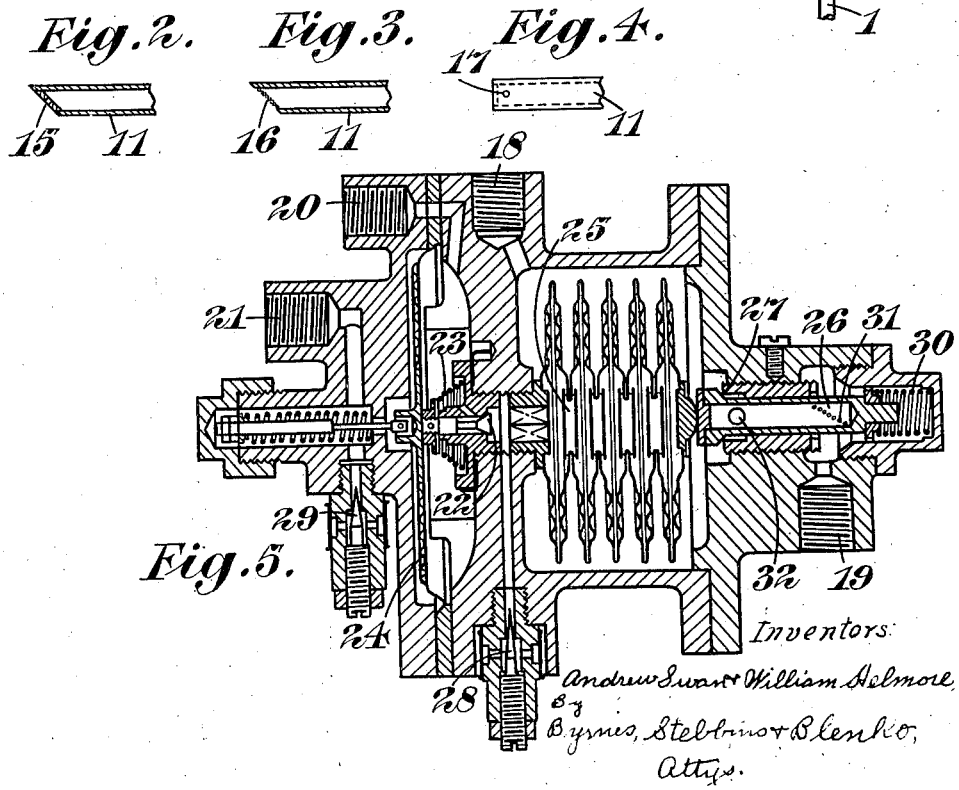

Patented May 14, 1935

2,001,164

UNITED STATES PATENT OFFICE 2,001,164

INDUCTION SYSTEM FOR INTERNAL COMBUSTION ENGINES

Andrew Swan and William Helmore, Hampshire, England

REISSUED

Application August 1, 1934, Serial No. 737,974
In Great Britain August 3, 1933

16 Claims. (Cl. 123—127)

This invention relates to means for preventing the formation and deposition of ice in the induction system of internal-combustion engines, where, owing to the evaporation of the liquid fuel causing a drop in the temperature of the intake air, the water contained in this air may be precipitated in the form of ice tending to restrict the air flow. It has special application to aircraft engines which frequently operate under conditions of air temperature and humidity likely to promote such freezing.

An object of the present invention is to provide means whereby anti-freezing substances may be automatically introduced into the fuel or air supply to the engine only at such times as there is a tendency for ice to be formed in the induction system. Thus, the character of the fuel normally used in the engine is not interfered with, except at such times as the anti-freezing mixture is required to be brought into operation.

According to this invention, a device for preventing detrimental ice formation in the induction system of an internal-combustion engine comprises means for supplying anti-freezing substances to such induction system and means adapted to be influenced by freezing conditions whereby automatically to control the supply of anti-freezing substance. Preferably, the means adapted to be influenced by the freezing conditions is located within said induction system.

A feature of the invention consists in that the means which is adapted to be influenced by the freezing conditions is also influenced by the pressure conditions within said induction system, whereby automatically to vary the quantity of anti-freezing substance supplied thereto in accordance with the throttle opening of the carburetter.

In one constructional form of the invention there is provided a valve-controlled means for supplying a liquid anti-freezing substance to said induction system, a flexible diaphragm adapted to operate said valve, both sides of which flexible diaphragm communicate through separate passages with said induction system, one of which passages is adapted to become blocked with ice when freezing conditions prevail but is also in permanent communication through a restricted passage with the atmosphere.

Thus, a fuel supply system for internal-combustion engines comprises the combination with a carburetter having a float chamber, fuel jet, throttle valve and an induction pipe, of a pipe line for feeding liquid anti-freezing substance to said carburetter, a valve in said pipe line, means located in said induction pipe adapted to be influenced by freezing conditions and adapted to open said valve when freezing conditions prevail. The anti-freezing material may be dispersed in a finely divided state in the space within the induction system by passing it through said fuel jet, and for this purpose it may be introduced into the fuel in the float chamber. The means adapted to be influenced by the freezing conditions may be located in the induction pipe above said throttle valve and may comprise two passages, one having a small opening adapted to become blocked with ice when freezing conditions prevail and the other having a larger opening, which passages communicate one on each side of a flexible diaphragm operatively connected to the aforesaid valve, so that when one passage becomes blocked the pressure conditions on the diaphragm are out of balance and the diaphragm is moved to open said valve.

The anti-freezing substance is preferably of such a nature as to have a strong affinity for moisture, for example, it may comprise a hydroxyl derivative of hydrocarbon which may contain less than three hydroxyl groups, for example, an alcohol such as methyl alcohol, ethyl alcohol, butyl alcohol or glycol or fusel oil or mixtures of these substances. The quantity of hydroxyl derivative of hydrocarbon in the fuel mixture may be from 2% to 50% of the volume of liquid fuel.

Automatic control may be obtained by a thermostatic device associated with a hygrometer so arranged that at any predetermined temperatures and relative humidities the introduction of the anti-freezing substance commences. This action may be effected through the medium of a servomotor. Alternatively, direct mechanical means may be used to operate automatically the anti-freezing mixture valve. For example the deposition of ice on a gauze or series of orifices mounted in the air stream in the induction pipe may be utilized to increase the air pressure on the surface of the gauze or orifices, thus supplying the necessary force to operate mechanism for opening this valve. In another method the formation of ice in the induction system may be utilized to block a duct or orifice in the induction system controlling, through a servomotor, the flow of the anti-freezing substance into the air stream or fuel supply.

The following is a description of one method of carrying this invention into effect as applied to the induction system of an engine, reference being made to the accompanying drawing, in which—

Figure 1 shows a diagrammatic view of a carburetter and induction pipe with automatic means for feeding and metering the anti-freezing substance;

Figures 2, 3 and 4 show freeze detectors; and

Figure 5 is a sectional view of the automatic feeding and metering device for anti-freeze substances embodied in Figure 1.

In Figure 1 the normal fuel to the engine is supplied through a pipe 1 to a float chamber 2 through a float controlled needle valve 3. A fuel metering and atomizing jet 4 conveys the fuel to an induction pipe 5 past a throttle 6. Automatic means 7 for controlling and metering the anti-freezing substance are supplied with anti-freezing substance through a pipe 8 and deliver it through a pipe 9 to the fuel in a carburetter at a point 10 below the jet 4.

It will be appreciated, however, that the anti-freeze substance can be admitted to or mixed with the fuel or air in any other convenient manner.

The pressure in the induction pipe is communicated to the automatic feeding and metering device through pipes 11 and 12. The pipe 11 has a freeze detector 13 projecting into the induction pipe 5 which is capable of being obstructed by ice. The pipe 12 communicates with the induction pipe by a relatively large opening 14 so that in the event of ice forming in the induction pipe it will obstruct the orifice 13 before any appreciable obstruction has occurred at 14. The orifice 14 may be made to face the mixture stream in a like manner to the orifice 13, whereby the velocity heads experienced by the two orifices will be similar and will balance each other so that changes in the velocity of the mixture stream will not affect the operation of the mechanism.

Three alternative forms of freeze detectors are shown in Figures 2, 3 and 4. In Figure 2 a small hole 15 is drilled in a plate fixed at an angle of approximately 45° in the end of the pipe 11 which can be set at the most suitable angle relative to the direction of mixture flow. In Figure 3 a multiplicity of orifices, as for example gauze, 16 is used. In Figure 4, 17 is a small hole drilled in the wall of the pipe 11, the end of which is closed. The hole is on that side of the pipe which faces the mixture flow and the pipe can be rotated to the most suitable position.

In the arrangement shown in Figure 5, the anti-freezing substance enters at a union socket 18 connected to the pipe 8 (Figure 1) and emerges from a union socket 19 communicating with the pipe 9 (Figure 1). A union socket 20 is connected to the pipe 12 (Figure 1). A union socket 21 is connected to the pipe 11 (Figure 1). In aircraft and other vehicles subject to large vertical accelerations it may be necessary to have a means for maintaining a relatively constant head at the union socket 18 by a valve controlled by a float, diaphragm, or other means. Alternatively, the anti-freeze substance may enter at the union socket 19 and leave at the union socket 18 in which case a suitable non-return valve will be required in the pipe 9 (Figure 1) to prevent diffusion of the anti-freeze substance into the float chamber 2 (Figure 1) when a valve 26 hereafter referred to is closed.

While there is no ice forming in the induction pipe, the orifice 13 (Figure 1) remains unobstructed and the pressures in the pipes 11 and 12 (Figure 1) are equal. A diaphragm 24 is so adjusted that under this condition a valve 22 is held on its seat by a spring 23. The pressure inside capsules 25 is maintained atmospheric through an adjustable air bleed 28. The capsules 25 are set with sufficient initial compression that the valve 26 is held on its seat 27 while the pressure inside the capsules 25 is atmospheric and so shuts off the anti-freeze substance.

Should ice form in the induction pipe it will first obstruct the orifice 13 (Figure 1). This will disturb the air flow through the orifice 13, and an air bleed 29 will allow the pressure to rise on one side of the diaphragm 24 and cause the valve 22 to open. The suction within the induction pipe is thus communicated through the valve 22 to the inside of the capsules 25, causing the capsules to contract and permit the metering valve 26 to rise from its seating 27 under the pressure of a spring 30. The anti-freezing substance is thus permitted to flow through a central bore 32 of the metering valve 26, through the metering holes or slots 31, to the union socket 19, and through the pipe 9 (Figure 1).

As it is desirable that the supply of anti-freezing substance should be approximately proportional to the fuel supplied to the engine at various throttle positions (for example, in the case of ethyl alcohol approximately 5% by volume of the fuel is satisfactory) it is arranged that the metering holes or slots 31 are successively closed as the suction within the induction pipe increases thus reducing the supply of anti-freezing substance as the engine is throttled.

We claim:—

1. A device for preventing detrimental ice formation in the induction system of an internal-combustion engine comprising means for supplying an anti-freezing substance to said induction system and means adapted to be influenced by freezing conditions, whereby automatically to control the supply of anti-freezing substance.

2. A device for preventing detrimental ice formation in the induction system of an internal-combustion engine comprising means for supplying an anti-freezing substance to said induction system and means located within said system and adapted to be influenced by freezing conditions, whereby automatically to control the supply of anti-freezing substance.

3. A device for preventing detrimental ice formation in the induction system of an internal-combustion engine comprising valve-controlled means for supplying a liquid anti-freezing substance to said induction system, means connected to said valve and located within said system so as to become coated with ice when freezing conditions prevail and adapted when so coated automatically to open said valve.

4. A device for preventing detrimental ice formation in the induction system of an internal-combustion engine comprising means for supplying an anti-freezing substance to said induction system and means adapted to be influenced by freezing conditions and by pressure conditions within said system whereby automatically to vary the quantity of anti-freezing substance in accordance with the engine speed when freezing conditions prevail.

5. A device for preventing detrimental ice formation in the induction system of an internal-combustion engine comprising a valve-controlled means for supplying a liquid anti-freezing substance to said induction system, means adapted to be influenced by freezing conditions and arranged to control a servo-motor which is adapted to operate said valve.

6. A device for preventing detrimental ice formation in the induction system of an internal-combustion engine comprising valve-controlled means for supplying a liquid anti-freezing substance to said induction system, pneumatic means for operating said valve and adapted to be influenced by freezing conditions, whereby said valve is automatically closed or opened.

7. A device for preventing detrimental ice formation in the induction system of an internal-combustion engine comprising a valve-controlled means for supplying a liquid anti-freezing substance to said induction system, differential pressure means connected to said valve and in communication through two passages with the same source of pressure, one of which passages is adapted to become blocked with ice when freezing conditions prevail, whereby automatically to operate said valve.

8. A device for preventing detrimental ice formation in the induction system of an internal-combustion engine comprising a valve-controlled means for supplying a liquid anti-freezing substance to said induction system, a differentially operated pressure means connected to said valve and in communication through two passages with said induction system, one of which passages is adapted to become blocked with ice when freezing conditions prevail, whereby automatically to operate said valve.

9. A device for preventing detrimental ice formation in the induction system of an internal-combustion engine comprising a valve-controlled means for supplying a liquid anti-freezing substance to said induction system, a flexible diaphragm adapted to operate said valve, both sides of which diaphragm are arranged to communicate through separate passages with said induction system, one of which passages is adapted to become blocked with ice when freezing conditions prevail and is also in permanent communication through a restricted passage with the atmosphere.

10. A device for preventing detrimental ice formation in the induction system of an internal-combustion engine comprising a valve-controlled means for supplying a liquid anti-freezing substance to said induction system, a pneumatic servo-motor mechanically connected to said valve and in communication both with the atmosphere through a restricted passage and with a space on one side of a diaphragm through a valve-controlled port, which space is also in permanent communication with a passage opening into said induction system, and a space on the other side of which diaphragm is in communication with said system through a second passage and through a restricted passage with the atmosphere, which second passage is adapted to become blocked with ice when freezing conditions prevail.

11. A device for preventing detrimental ice formation in a fuel fed carburetter for an internal-combustion engine comprising means for supplying an anti-freezing substance to the fuel and means adapted to be influenced by freezing conditions, whereby automatically to control the supply of anti-freezing substance.

12. A device for preventing detrimental ice formation in a carburetter for an internal-combustion engine having a float chamber for controlling the flow of fuel, which device comprises means for supplying anti-freezing substance to the fuel in said float chamber and means adapted to be influenced by freezing conditions, whereby automatically to control the supply of anti-freezing substance.

13. A device for preventing detrimental ice formation in a fuel fed carburetter, which device comprises means for supplying an anti-freezing substance to the fuel feed and means adapted to be influenced by freezing conditions and pressure conditions within said system, whereby automatically to vary the quantity of anti-freezing substance supplied to the fuel in accordance with the speed of the engine when freezing conditions prevail.

14. A fuel supply system for an internal-combustion engine comprising the combination with a carburetter having a float chamber, fuel jet, throttle valve and induction pipe of a pipe line for feeding liquid anti-freezing substance to said carburetter, a valve in said pipe line, means located in said induction pipe adapted to be influenced by freezing conditions and adapted to open said valve when freezing conditions prevail.

15. A fuel supply system for an internal-combustion engine comprising the combination with a carburetter having a float chamber, fuel jet, throttle valve and induction pipe of a pipe line communicating with said float chamber and adapted to feed liquid anti-freezing substance thereto, a valve in said pipe line, means located in said induction pipe adapted to be influenced by freezing conditions and adapted to open said valve when freezing conditions prevail.

16. A fuel supply system for an internal-combustion engine comprising the combination with a carburetter having a float chamber, fuel jet, throttle valve and induction pipe of a pipe line for feeding liquid anti-freezing substance to said carburetter, a valve in said pipe line, two passages opening into said induction pipe above said throttle valve, one of which passages has a restricted opening, a diaphragm mounted in a chamber so as to provide two compartments, each of which compartments communicates with one of said passages and means for connecting said diaphragm to said valve.

ANDREW SWAN.
WILLIAM HELMORE.